(12) United States Patent
Song (10) Patent No.: US 9,025,448 B2
(45) Date of Patent: May 5, 2015

(54) METHODS AND APPARATUSES FOR ACCESSING INTERNET

(71) Applicant: Huawei Device Co., Ltd., Shenzhen (CN)

(72) Inventor: Chuan Song, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 237 days.

(21) Appl. No.: 13/763,805

(22) Filed: Feb. 11, 2013

(65) Prior Publication Data

US 2014/0056131 A1 Feb. 27, 2014

(30) Foreign Application Priority Data

Jun. 5, 2012 (CN) .......................... 2012 1 0182020

(51) Int. Cl.
| | |
|---|---|
| H04L 12/28 | (2006.01) |
| H04W 4/00 | (2009.01) |
| H04W 28/02 | (2009.01) |
| H04W 48/12 | (2009.01) |
| H04W 84/00 | (2009.01) |
| H04W 84/12 | (2009.01) |

(52) U.S. Cl.
CPC .......... *H04W 28/0289* (2013.01); *H04W 48/12* (2013.01); *H04W 84/005* (2013.01); *H04W 84/12* (2013.01)

(58) Field of Classification Search
None
See application file for complete search history.

(56) References Cited

U.S. PATENT DOCUMENTS

| | | |
|---|---|---|
| 2005/0135236 A1 | 6/2005 | Benson et al. |
| 2007/0159997 A1 | 7/2007 | Tsai et al. |
| 2011/0292835 A1 | 12/2011 | Zhu |
| 2012/0096132 A1 | 4/2012 | Lim et al. |

FOREIGN PATENT DOCUMENTS

| | | |
|---|---|---|
| CN | 1638351 A | 7/2005 |
| CN | 1829177 A | 9/2006 |
| CN | 101448336 A | 6/2009 |
| CN | 101674214 A | 3/2010 |
| CN | 101873719 A | 10/2010 |
| CN | 102256336 A | 11/2011 |
| CN | 102685845 A | 9/2012 |
| EP | 2252115 A1 | 11/2010 |
| WO | WO 2007/096884 A2 | 8/2007 |

OTHER PUBLICATIONS

International Search Report issued in corresponding PCT Patent Application No. PCT/CN2013/070452, mailed Apr. 25, 2013, 11 pages.
Extended European Search Report issued in corresponding European Patent Application No. 13155972.6, mailed May 15, 2013.

*Primary Examiner* — Habte Mered
(74) *Attorney, Agent, or Firm* — Brinks Gilson & Lione (57) ABSTRACT

Embodiments of the present invention relate to methods and apparatuses for accessing the Internet. The method includes: establishing a connection with a mobile access point (AP), and receiving service set identifier (SSID) information and encryption information of the mobile AP by using a physical connection channel storing the SSID information and the encryption information of the mobile AP into a first SSID name; sending disable information to the mobile AP, where the disable information is used for the mobile AP to disable its Wi-Fi search function; and enabling its first SSID name, so that a mobile terminal in communication with the mobile AP accesses the Internet by invoking the SSID information and the encryption information in the first SSID name.

13 Claims, 5 Drawing Sheets

METHODS AND APPARATUSES FOR ACCESSING INTERNET

CROSS-REFERENCE TO RELATED APPLICATIONS

This application claims priority to Chinese Patent Application No. 201210182020.6, filed on Jun. 5, 2012, which is hereby incorporated by reference in its entirety.

FIELD OF THE INVENTION

The present invention relates to the field of communications technologies, and in particular, to methods and apparatuses for accessing the Internet.

BACKGROUND OF THE INVENTION

A wireless access point (AP) is a wireless switch applicable to a wireless network and also a core of the wireless network. The wireless AP is an access point for a user terminal to access a wired network. A wireless AP is primarily used to access a wired network from a broadband home, in a building, or in a community, and its typical coverage distance is dozens to hundreds of meters. Currently based on technologies of 802.11 series, most wireless APs provide an access point client mode, and may have a wireless connection with other APs to extend network coverage.

Figure 1:
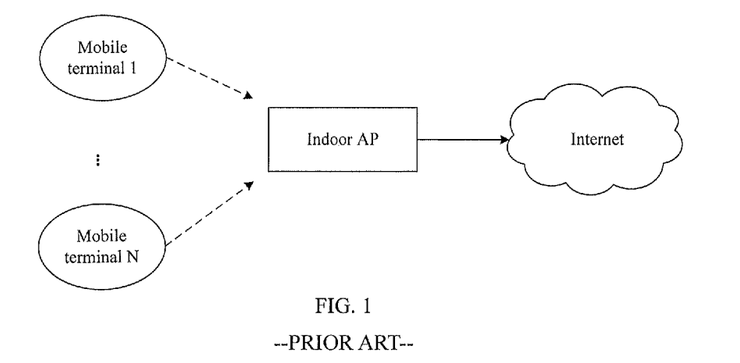
FIG. 1 is a diagram of connecting an indoor AP to a fixed network in the prior art.
Figure 2:
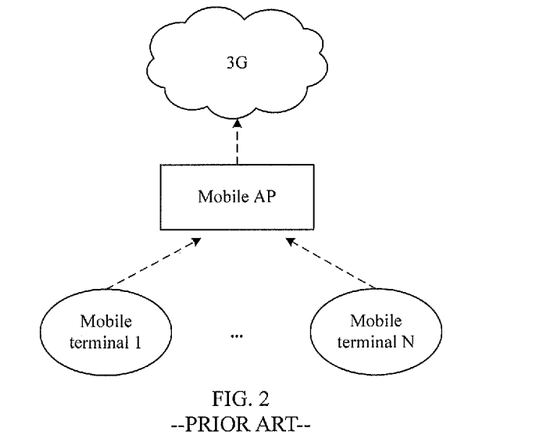
FIG. 2 is a diagram of connecting a mobile AP to a 3G network in the prior art.

The wireless fidelity (Wireless Fidelity, wi-fi) technology has been developed rapidly and applied widely in the past decade. The Wi-Fi technology is an Internet technology allows a user terminal to access an email, a webpage, and streaming media, and provides the user terminal with wireless broadband Internet access. Meanwhile, it is also a fast and convenient means of accessing the Internet at home, in an office or on a trip. A place where a Wi-Fi network can be accessed is called a hotspot. There are more and more scenarios where multiple Wi-Fi-enabled APs are combined, as shown in FIG. 1 and FIG. 2. In FIG. 1, an indoor user terminal is connected to the Internet by using an indoor AP. Equipped with a Wi-Fi search function, the indoor user terminal searches for and is connected to a service set identifier (SSID) name of the indoor AP, and enables the user terminal to be connected to the Internet by using the indoor AP. In FIG. 2, an outdoor user terminal is connected to the Internet by using a mobile AP. Equipped with a Wi-Fi search function, the outdoor user terminal searches for and is connected to an SSID name of the mobile AP, and causes the user terminal to be connected to a 3G network by using the mobile AP.

Currently, 3G dial-up-based Internet access manner of the user terminal is convenient and fast, and most user terminals support the function of the 3G dial-up access to the Internet. However, ongoing increase of user terminals may exhaust limited network resources. Therefore, disadvantage of the prior art is that numerous user terminals increase the frequency of using network resources and lead to network congestion.

SUMMARY OF THE INVENTION

Embodiments of the present invention disclose methods and apparatuses for accessing the Internet to control combined application of multiple access points conveniently and accurately, reduce the frequency of using a 3G network and reduce network congestion while network users increase constantly.

In a first aspect, an embodiment of the present invention provides a method for accessing the Internet, and the method includes:

receiving, by an indoor AP, SSID information and encryption information of a mobile AP by using a physical connection channel;

storing the SSID information and the encryption information of the mobile AP into a first SSID name;

sending disable information to the mobile AP, where the disable information is used for the mobile AP to disable its Wi-Fi search function; and enabling the first SSID name so that a mobile terminal in communication with the mobile AP accesses the Internet by invoking the SSID information and the encryption information in the first SSID name.

In a second aspect, an embodiment of the present invention provides a method for accessing the Internet, and the method includes:

sending, by a mobile AP, its SSID information and encryption information to an indoor AP by using a physical connection channel so that the SSID information and the encryption information are written into a first SSID name of the indoor AP;

receiving disable information sent by the indoor AP; and disabling its Wi-Fi search function according to the disable information so that a mobile terminal in communication with the mobile AP accesses the Internet by invoking the SSID information and the encryption information in the first SSID name of the indoor AP.

In a third aspect, an embodiment of the present invention provides an indoor AP, and the indoor AP includes:

a physical interface, configured to establish a physical connection with a mobile AP;

a receiver, configured to receive SSID information and encryption information of a mobile AP after a physical connection channel is established with the mobile AP, and transmit the SSID information and the encryption information of the mobile AP to a storage device;

the storage device, configured to store the SSID information and the encryption information of the mobile AP, which are received by the receiver, into a first SSID name;

a sender, configured to send disable information to the mobile AP after the storage device stores the SSID information and the encryption information of the mobile AP into the first SSID name, where the disable information is used for the mobile AP to disable its Wi-Fi search function; and a processor, configured to enable the first SSID name stored in the storage device after the sender sends the disable information so that a mobile terminal in communication with the mobile AP accesses the Internet by invoking the SSID information and the encryption information in the first SSID name.

In a fourth aspect, an embodiment of the present invention provides a mobile AP, and the mobile AP includes:

a physical interface, configured to establish a physical connection with an indoor AP;

a sender, configured to send its SSID information and encryption information to the indoor AP after a physical connection channel is established with the indoor AP;

a receiver, configured to receive disable information sent by the indoor AP after the sender sends the SSID information and the encryption information to the indoor AP, and transmit the disable information to a processor; and the processor, configured to trigger disabling of its Wi-Fi search function according to the disable information received by the receiver so that a mobile terminal in communication with the mobile AP accesses the Internet by invoking the SSID information and the encryption information in the first SSID name of the indoor AP.

With the methods and the apparatuses for combined application of access points in the embodiments of the present invention, a mobile AP and an indoor AP can work collaboratively to share a fixed network bandwidth; after the mobile AP and the indoor AP that once work collaboratively are separated from each other, the mobile AP can be connected to a fixed network by using the indoor AP within a valid range, thereby reducing consumption of network resources and facilitating users.

DETAILED DESCRIPTION OF THE EMBODIMENTS

The make the objectives, technical solutions, and advantages of the present invention more comprehensible, the following further describes the specific embodiments of the present invention in detail with reference to the accompanying drawings.

Figure 3:
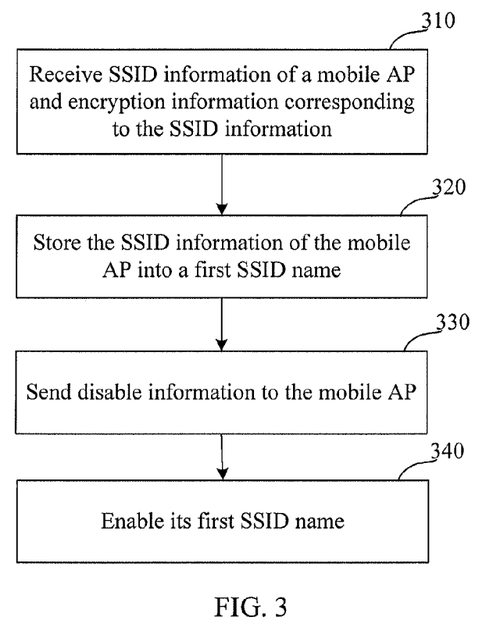
FIG. 3 is a flowchart of a method for accessing the Internet according to an embodiment of the present invention.

The following gives details about a method for accessing the Internet according to an embodiment of the present invention by taking FIG. 3 as an example. FIG. 3 is a flowchart of a method for accessing the Internet according to an embodiment of the present invention.

As shown in FIG. 3, an indoor access point (AP) includes multiple SSID names such as a first SSID name and a second SSID name; the indoor AP detects an action of a mobile AP, such as establishing or interrupting a physical connection, where the action of establishing or interrupting a physical connection is specifically an action of plugging or unplugging the mobile AP. After a physical connection is established successfully between the mobile AP and the indoor AP, the indoor AP establishes a physical connection channel with the mobile AP connected thereto, and the indoor AP exchanges information with the mobile AP by using the physical connection channel. After the physical connection channel is established, the indoor AP receives SSID information of the mobile AP and encryption information corresponding to the SSID information from the mobile AP, and configures the received SSID information and encryption information of the mobile AP into a first SSID name. Upon completion of configuring the received SSID information and encryption information of the mobile AP, the indoor AP sends disable information to the mobile AP. The mobile AP disables its Wi-Fi search function, and the indoor AP enables information in the first SSID name.

Optionally, the indoor AP sends information in its second SSID name to the mobile AP; after receiving the information in the second SSID name of the indoor AP, the mobile AP stores the information; and a user terminal in communication with the mobile AP is indirectly connected to the Internet by using the first SSID name of the indoor AP.

If the indoor AP detects physical disconnection of the mobile AP, that is, detects that the mobile AP is unplugged from the indoor AP while the mobile terminal is still connected to the Internet by using the indoor AP, the mobile AP invokes the stored information in the second SSID name sent by the indoor AP, and searches for and is connected to the second SSID name of the indoor AP, so that the user terminal in communication with the mobile AP can also be indirectly connected to the Internet by using the second SSID name of the indoor AP.

The method for combined application of access points requires the following steps. The entity for implementing the following steps is an indoor AP. As shown in FIG. 3, the following detailed steps are included:

Step 310: An indoor AP receives SSID information of a mobile AP and encryption information corresponding to the SSID information by using a physical connection channel.

Specifically, the indoor AP includes multiple SSID names such as a first SSID name and a second SSID name. The indoor AP detects an action of the mobile AP of establishing or interrupting a physical connection, where the action of establishing or interrupting a physical connection is specifically an action of plugging or unplugging the mobile AP. After a physical connection is established successfully between the mobile AP and the indoor AP, the indoor AP establishes a physical connection channel with the mobile AP connected thereto, and the indoor AP exchanges information with the mobile AP by using the physical connection channel. After the physical connection channel is established, the indoor AP receives the SSID information of the mobile AP and the encryption information corresponding to the SSID information from the mobile AP.

Step 320: The indoor AP stores the SSID information and the encryption information of the mobile AP into a first SSID name.

Specifically, after receiving the SSID information of the mobile AP and the encryption information corresponding to the SSID information from the mobile AP, the indoor AP stores the received SSID information and encryption information of the mobile AP into the first SSID name of the indoor AP.

Step 330: The indoor AP Send disable information to the mobile AP, where the disable information is used for the mobile AP to disable its Wi-Fi search function.

Specifically, as described in step 310 and step 320, after configuring the received SSID information and encryption information of the mobile AP into the first SSID name, the indoor AP sends disable information to the mobile AP, where the disable information is used for the mobile AP to disable its Wi-Fi search function. Therefore, in a period after the mobile AP disables its Wi-Fi search function, the mobile terminal connected to the mobile AP is disconnected from the mobile AP.

Step 340: The indoor AP enables its first SSID name, and the user terminal in communication with the mobile AP accesses the Internet by invoking the SSID information and the encryption information in the first SSID name.

Specifically, as described in step 330, the indoor AP enables its first SSID name after the mobile AP disables its Wi-Fi search function according to the disable information.

The SSID information and the encryption information corresponding to the SSID information, which are sent by the mobile AP, are stored in the first SSID name of the indoor AP. Therefore, the user terminal previously in communication with the mobile AP now accesses the Internet indirectly by invoking the enabled first SSID name of the indoor AP.

Optionally, after enabling the first SSID name of the indoor AP, the indoor AP sends the SSID information and the encryption information in the second SSID name to the mobile AP by using the established physical connection channel, and the mobile AP stores the received SSID information and encryption information in the second SSID name into a configuration file.

If the indoor AP detects physical disconnection of the mobile AP, that is, detects that the mobile AP is unplugged from the indoor AP, the indoor AP disables the first SSID name. Meanwhile, the mobile AP receives enable information input by the user, where the enable information is used for the mobile AP to enable its Wi-Fi search function. After the mobile AP enables the Wi-Fi search function, because the information in the second SSID name sent by the indoor AP is stored by the mobile AP into the configuration file in the mobile AP, the mobile AP invokes the stored information in the second SSID name in the configuration file within a Wi-Fi search function range of the mobile AP after the Wi-Fi search function is enabled, searches for and is connected to the second SSID name of the indoor AP according to the invoked information, and is connected to the Internet by using the SSID information and the encryption information in the second SSID name of the indoor AP.

It should be noted that multiple SSID names may coexist in the indoor AP. The multiple SSID names may be connected to multiple mobile APs. In the embodiment of the present invention, the process of configuring the indoor AP with a mobile AP is described in an exemplary manner only. In practical application, indoor AP may be configured with multiple mobile APs simultaneously, and all mobile terminals connected to the multiple mobile APs are connected to the Internet by using the indoor AP indirectly.

With the method for accessing the Internet in the embodiment of the present invention, a mobile AP and an indoor AP can work collaboratively to share a fixed network bandwidth; after the mobile AP and the indoor AP that once work collaboratively are separated from each other, the mobile AP can be connected to a fixed network by using the indoor AP within a valid range, thereby reducing consumption of network resources and facilitating users.

Figure 4:
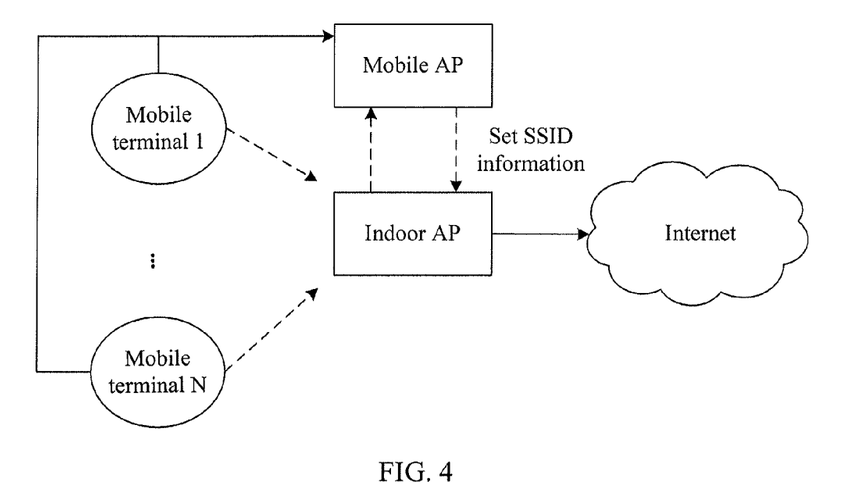
FIG. 4 is a configuration diagram of applying a mobile AP and an indoor AP according to an embodiment of the present invention.
Figure 5:
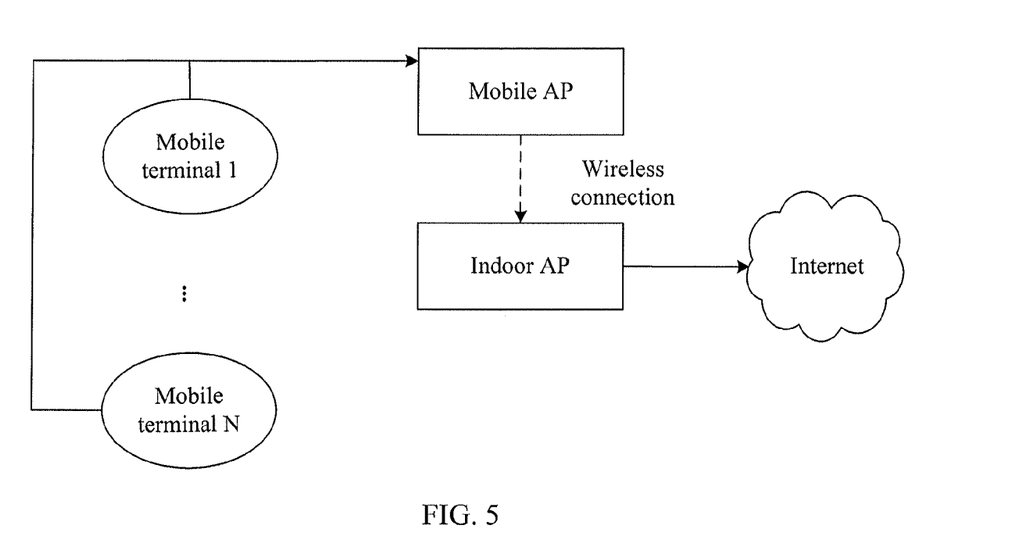
FIG. 5 is a diagram of applying a mobile AP and an indoor AP to connect to a fixed network according to an embodiment of the present invention.

The following gives details about an Internet access method disclosed in an embodiment of the present invention by taking FIG. 4 as an example and referring to FIG. 5. FIG. 4 is a configuration diagram of applying a mobile AP and an indoor AP according to an embodiment of the present invention, and FIG. 5 is a diagram of applying a mobile AP and an indoor AP to connect to a fixed network according to an embodiment of the present invention.

As shown in FIG. 4, the indoor AP includes multiple SSID names such as a first SSID name and a second SSID name; the indoor AP detects an action of establishing or interrupting a physical connection, where the action of establishing or interrupting a physical connection is specifically an action of plugging or unplugging the mobile AP.

After a physical connection is established successfully between the mobile AP and the indoor AP, the indoor AP establishes a physical connection channel with the mobile AP connected thereto, and the indoor AP exchanges information with the mobile AP by using the physical connection channel. After the physical connection channel is established, the mobile AP sends SSID information of the mobile AP and encryption information corresponding to the SSID information to the indoor AP; after receiving the SSID information of the mobile AP and the encryption information corresponding to the SSID information from the mobile AP, the indoor AP configures the received SSID information and encryption information of the mobile AP into a first SSID name.

After the indoor AP configures the received SSID information and encryption information of the mobile AP, because the mobile AP has been plugged into the indoor AP, the indoor AP sends disable information to the mobile AP, the mobile AP disables its Wi-Fi search function, and meanwhile, the indoor AP enables information in the first SSID name. The second SSID name of the indoor AP still retains the SSID information for the user terminal to perform access. The indoor AP sends the information in its second SSID name to the mobile AP. After receiving the information in the second SSID name of the indoor AP, the mobile AP stores the information into its configuration file. FIG. 4 uses dotted lines to show a process of setting SSID information between the mobile AP and the indoor AP. The user terminal in communication with the mobile AP (illustrated by solid lines in FIG. 4) is connected to the Internet by invoking the SSID information and the encryption information in the first SSID name of the indoor AP. That is, user terminal 1, . . . , and user terminal n connect to the Internet directly by using the SSID information and the encryption information in the first SSID name of the indoor AP (illustrated by dotted lines in FIG. 4).

As shown in FIG. 5, if the indoor AP detects physical disconnection of the mobile AP, that is, detects that the mobile AP is unplugged from the indoor AP, the indoor AP disables the first SSID name; meanwhile, the mobile AP receives enable information input by the user, where the enable information is used for the mobile AP to enable its Wi-Fi search function; as described earlier above, after the mobile AP enables the Wi-Fi search function, because the SSID information and the encryption information in the second SSID name sent by the indoor AP are stored by the mobile AP into a configuration file in the mobile AP, the mobile AP invokes the previously stored SSID information and encryption information in the second SSID name in the configuration file after the Wi-Fi search function of the mobile AP is enabled, searches for and is connected to the second SSID name of the indoor AP according to the invoked information, and is connected to the Internet by using the SSID information and the encryption information in the second SSID name of the indoor AP.

Figure 6:
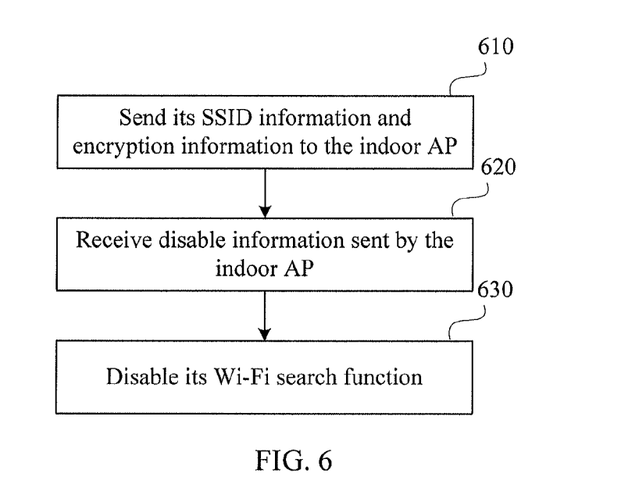
FIG. 6 is a flowchart of another method for accessing the Internet according to an embodiment of the present invention.

The following gives details about another method for accessing the Internet according to an embodiment of the present invention by taking FIG. 6 as an example. FIG. 6 is a flowchart of another method for accessing the Internet according to an embodiment of the present invention.

The method for combined application of access points requires the following steps. The entity for implementing the following steps is a mobile AP. As shown in FIG. 6, the following detailed steps are included:

Step 610: The mobile AP sends its SSID information and encryption information to an indoor AP.

Specifically, the mobile AP establishes a physical connection with the indoor AP, where the action of establishing or interrupting a physical connection is specifically an action of plugging or unplugging the mobile AP. The indoor AP detects an action of the mobile AP of establishing or interrupting a physical connection. After a physical connection is established successfully between the mobile AP and the indoor AP, the indoor AP establishes a physical connection channel with the mobile AP connected thereto, and the indoor AP exchanges information with the mobile AP by using the physical connection channel. After knowing that the physical connection channel is established successfully, the mobile AP sends the SSID information of the mobile AP and the encryption information corresponding to the SSID information to the indoor AP.

Step 620: The mobile AP receives disable information sent by the indoor AP.

Specifically, as described in step 610, after configuring the received SSID information and encryption information of the mobile AP into a first SSID name, the indoor AP sends the disable information to the mobile AP, and the mobile AP receives the disable information sent by the indoor AP, where the disable information is used for the mobile AP to disable its Wi-Fi search function. Therefore, in a period after the mobile AP disables its Wi-Fi search function, a mobile terminal connected to the mobile AP is disconnected from the mobile AP.

Step 630: The mobile AP disables its Wi-Fi search function according to the disable information so that the mobile terminal in communication with the mobile AP accesses the Internet by invoking the SSID information and the encryption information in the first SSID name of the indoor AP.

Specifically, as described in step 620, the indoor AP enables its first SSID name after the mobile AP disables its Wi-Fi search function according to the disable information.

The SSID information and the encryption information corresponding to the SSID information, which are sent by the mobile AP, are stored in the first SSID name of the indoor AP. Therefore, the user terminal previously in communication with the mobile AP now is connected to the Internet indirectly by invoking the enabled first SSID name of the indoor AP.

Optionally, after enabling the first SSID name of the indoor AP, the indoor AP sends SSID information and encryption information in a second SSID name to the mobile AP by using an established physical connection channel, and the mobile AP stores the received SSID information and encryption information in the second SSID name into a configuration file.

If the indoor AP detects physical disconnection of the mobile AP, that is, detects that the mobile AP is unplugged from the indoor AP, the indoor AP disables the first SSID name; meanwhile, the mobile AP receives enable information input by the user, where the enable information is used for the mobile AP to enable its Wi-Fi search function; after the mobile AP enables the Wi-Fi search function, because the information in the second SSID name sent by the indoor AP is stored by the mobile AP into the configuration file in the mobile AP, the mobile AP invokes the stored information in the second SSID name in the configuration file within a Wi-Fi search function range of the mobile AP after the Wi-Fi search function is enabled, searches for and is connected to the second SSID name of the indoor AP according to the invoked information, and is connected to the Internet by using the SSID information and the encryption information in the second SSID name of the indoor AP.

With the method for accessing the Internet in the embodiment of the present invention, a mobile AP and an indoor AP can work collaboratively to share a fixed network bandwidth; after the mobile AP and the indoor AP that once work collaboratively are separated from each other, the mobile AP can be connected to a fixed network by using the indoor AP within a valid range, thereby reducing consumption of network resources and facilitating users.

Figure 7:
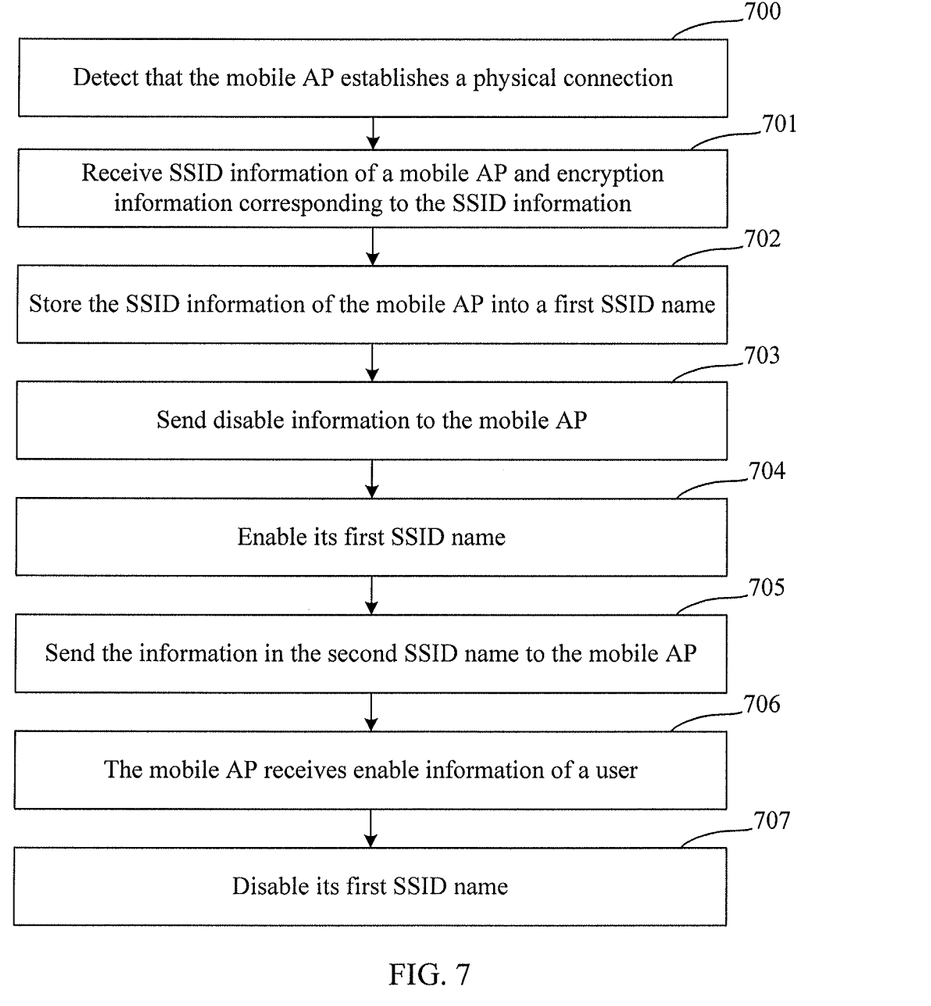
FIG. 7 is a detailed flowchart of a method for accessing the Internet according to an embodiment of the present invention.

With respect to the above descriptions about FIG. 4 and FIG. 5, the detailed implementation process is shown in FIG. 7. FIG. 7 is a detailed flowchart of a method for accessing the Internet according to an embodiment of the present invention.

As shown in FIG. 7, the detailed steps of using an indoor AP and a mobile AP together include:

Step 700: The indoor AP detects that the mobile AP establishes a physical connection.

Specifically, the indoor AP includes multiple SSID names such as a first SSID name and a second SSID name, and the indoor AP detects an action of the mobile AP of establishing a physical connection, where the action of establishing a physical connection is specifically an action of plugging the mobile AP. If the indoor AP detects that the mobile AP establishes a physical connection, step 701 is performed.

Step 701: The indoor AP receives SSID information and encryption information of the mobile AP.

Specifically, as described in step 700, the indoor AP has detected that the mobile AP establishes a physical connection, and therefore, the indoor AP notifies the mobile AP that the indoor AP is connected successfully. The indoor AP establishes a physical connection channel to the mobile AP connected to the indoor AP, and the indoor AP exchanges information with the mobile AP by using the physical connection channel. After knowing the successful connection, the mobile AP sends the SSID information of the mobile AP and the encryption information corresponding to the SSID information to the indoor AP.

Step 702: The indoor AP stores the SSID information and the encryption information of the mobile AP into a first SSID name.

Specifically, after receiving the SSID information of the mobile AP and the encryption information corresponding to the SSID information from the mobile AP, the indoor AP configures the received SSID information and encryption information of the mobile AP into the first SSID name. In the embodiment of the present invention, the SSID information in the first SSID name of the indoor AP is reserved. The SSID information in the second SSID name is "ABCD", the SSID information of the mobile AP is "EFGH", and the indoor AP configures the SSID information of the mobile AP into the first SSID name. Therefore, the SSID information in the first SSID name is "EFGH".

Step 703: The indoor AP sends disable information to the mobile AR

Specifically, after storing the SSID information and the encryption information which are sent by the mobile AP, the indoor AP sends the disable information to the mobile AP, where the disable information is used for the mobile AP to disable its Wi-Fi search function. After receiving the disable information, the mobile AP disables its Wi-Fi search function. It should be noted that because the mobile AP has disabled its Wi-Fi search function at this time, the mobile terminal connected to the mobile AP will be disconnected from the mobile AP in a period.

Step 704: The indoor AP enables its first SSID name, and the user terminal in communication with the mobile AP is connected to the Internet by using the first SSID name.

Specifically, as described in step 703, after sending the disable information to the mobile AP, the indoor AP enables its first SSID name.

According to the description about the previous step, the SSID information of the mobile AP, "EFGH", and the corresponding encryption information are stored in the first SSID name of the indoor AP, the mobile AP has disabled its Wi-Fi search function, and the indoor AP has enabled the first SSID name. Therefore, the user terminal previously in communication with the mobile AP now accesses the Internet indirectly by invoking the SSID information and the encryption information in the enabled first SSID name of the indoor AP.

Step 705: The indoor AP sends the SSID information and the encryption information in the second SSID name to the mobile AP.

Specifically, the second SSID name of the indoor AP still retains the SSID information for the user terminal to perform access, that is, "ABCD". The indoor AP sends the SSID information and the encryption information in the second SSID name to the mobile AP. After receiving the SSID information and the encryption information in the second SSID name of the indoor AP, the mobile AP stores the SSID information and the encryption information into a configuration file in the mobile AP. Therefore, the configuration file of the mobile AP stores the SSID information and the encryption information "ABCD" in the second SSID name of the indoor AP.

It should be noted that step 705 may be performed anytime while the mobile AP establishes the physical connection with the indoor AP.

Step 706: The mobile AP receives enable information of a user.

Specifically, after the physical connection is interrupt between the mobile AP and the indoor AP, where the physical connection may be interrupt for many reasons, for example, the user unplugs the mobile AP from the indoor AP, or a communication connection channel between the mobile AP and the indoor AP is faulty, the mobile AP receives the enable information of a user, enables its Wi-Fi search function according to the enable information, and searches for the SSID information and the encryption information in the second SSID name of the indoor AP.

Step 707: The indoor AP disables its first SSID name.

Specifically, if the indoor AP detects physical disconnection of the mobile AP, the indoor AP disables its first SSID name.

As described in the previous step, when the mobile AP establishes a physical connection with the indoor AP, the mobile AP stores the SSID information and the encryption information in the second SSID name, which are sent by the indoor AP, into a configuration file of the mobile AP. Therefore, after enabling the Wi-Fi search function of the mobile AP, the mobile AP invokes the stored SSID information and the encryption information in the second SSID name within the configuration file, searches for and is connected to the SSID information and the encryption information in the second SSID name of the indoor AP within a Wi-Fi search range of the mobile AP according to the invoked information by using the Wi-Fi search function of the mobile AP, and is connected to the Internet by using the SSID information and the encryption information in the second SSID name of the indoor AP.

With the method for accessing the Internet in the embodiment of the present invention, a mobile AP and an indoor AP can work collaboratively to share a fixed network bandwidth; after the mobile AP and the indoor AP that once work collaboratively are separated from each other, the mobile AP can be connected to a fixed network by using the indoor AP within a valid range, thereby reducing consumption of network resources and facilitating users.

Figure 8:
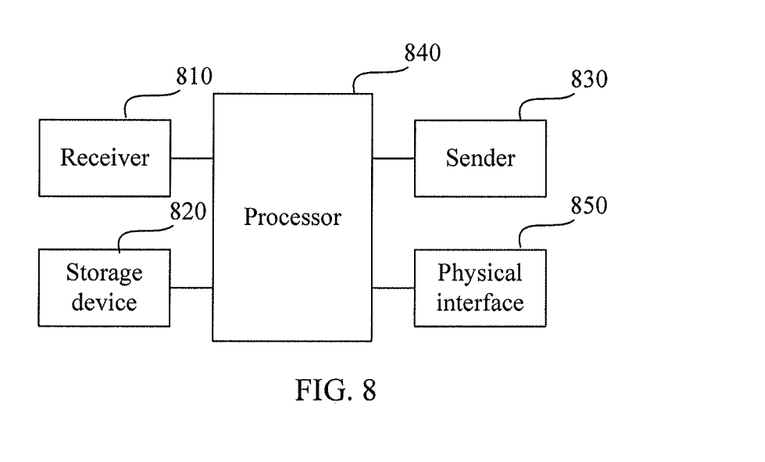
FIG. 8 is an apparatus diagram of an indoor AP according to an embodiment of the present invention.

The above embodiment is a description about a method for applying access points. Correspondingly, the method may be implemented by an access point application apparatus. FIG. 8 is an apparatus diagram of an indoor AP according to an embodiment of the present invention, which is used for implementing the above method embodiment shown in FIG. 3. As shown in FIG. 8, the indoor AP includes a receiver 810, a storage device 820, a sender 830, and a processor 840.

The receiver 810 is configured to receive SSID information and encryption information of a mobile AP after a physical connection channel is established with the mobile AP, and transmit the SSID information and the encryption information of the mobile AP to the storage device.

The storage device 820 is configured to store the SSID information and the encryption information of the mobile AP, which are received by the receiver, into a first SSID name.

The sender 830 is configured to send disable information to the mobile AP after the storage device stores the SSID information and the encryption information of the mobile AP into the first SSID name, where the disable information is used for the mobile AP to disable its Wi-Fi search function.

The processor 840 is configured to enable the first SSID name stored in the storage device after the sender sends the disable information so that a mobile terminal in communication with the mobile AP accesses the Internet by invoking the SSID information and the encryption information in the first SSID name.

Optionally, the indoor AP further includes a physical interface 850, configured to establish a physical connection with a mobile AP.

The receiver 810 is further configured to: if the processor detects that the mobile AP has established a physical connection, instruct the receiver to receive the SSID information and the encryption information of the mobile AP.

The sender 830 is further configured to send the SSID information and the encryption information in the second SSID name to the mobile AP after sending the disable information to the mobile AP so that the mobile AP stores the SSID information and the encryption information in the second SSID name into a configuration file.

The physical interface 850 is further configured to interrupt a physical connection with the mobile AP.

The processor 840 is further configured to disable the first SSID name in the storage device if the processor detects physical disconnection of the mobile AP so that the mobile terminal in communication with the mobile AP is connected to the Internet by invoking the SSID information and the encryption information in the second SSID name.

With the access point application apparatus in the embodiment of the present invention, a mobile AP and an indoor AP can work collaboratively to share a fixed network bandwidth; after the mobile AP and the indoor AP that once work collaboratively are separated from each other, the mobile AP can be connected to a fixed network by using the indoor AP within a valid range, thereby reducing consumption of network resources and facilitating users.

Figure 9:
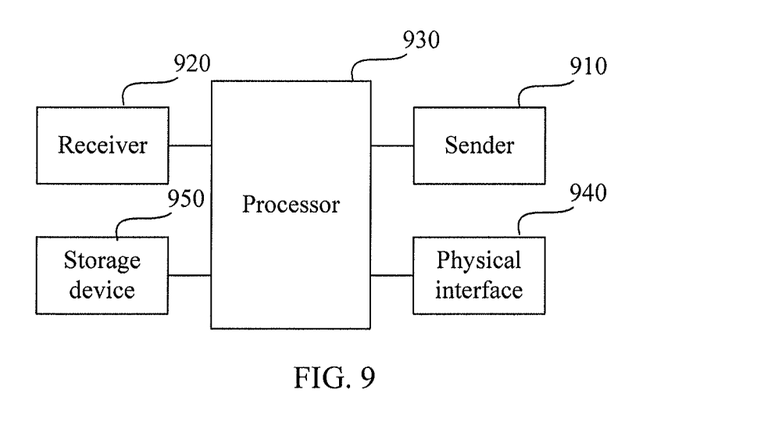
FIG. 9 is an apparatus diagram of a mobile AP according to an embodiment of the present invention.

The above embodiment is a description about a method for applying access points. Correspondingly, the method may be implemented by an access point application apparatus. FIG. 9 is an apparatus diagram of a mobile AP according to an embodiment of the present invention, which is used for implementing the above method embodiment shown in FIG. 6. As shown in FIG. 9, the indoor AP includes a sender 910, a receiver 920, and a processor 930.

The sender 910 is configured to send its SSID information and encryption information to the indoor AP after a physical connection channel is established with a mobile AP.

The receiver 920 is configured to receive disable information sent by the indoor AP after the sender sends the SSID information and the encryption information to the indoor AP, and transmit the disable information to the processor.

The processor 930 is configured to trigger disabling of its Wi-Fi search function according to the disable information received by the receiver so that a mobile terminal in communication with the mobile AP accesses the Internet by invoking the SSID information and the encryption information in the first SSID name of the indoor AP.

The mobile AP further includes a physical interface 940, configured to establish a physical connection with the indoor AP.

The receiver 920 is further configured to receive the SSID information and the encryption information in the second SSID name of the indoor AP from the indoor AP after receiving the disable information sent by the indoor AP, and transmit the SSID information and the encryption information in the received second SSID name of the indoor AP to a storage device.

The mobile AP further includes the storage device 950, configured to store the SSID information and the encryption information in the second SSID name of the indoor AP, which are received by the receiver, into a configuration file.

The physical interface 940 is further configured to interrupt a physical connection with the indoor AP.

The receiver 920 is further configured to receive enable information of a user and transmit the enable information to the processor.

The processor 930 is further configured to enable its Wi-Fi search function according to the enable information received by the receiver, and search for the SSID information and the encryption information in the second SSID name of the indoor AP so that the mobile terminal in communication with the mobile AP is connected to the Internet by invoking the SSID information and the encryption information in the second SSID name.

Persons skilled in the art may further be aware of that, in combination with the examples described in the examples described in the embodiments disclosed herein, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The steps of a method or algorithm described in connection with the embodiments disclosed herein may be embodied in hardware, in the software module performed by a processor, or in a combination of the two. The software module may be located in a Random Access Memory (RAM), a computer memory, a Read Only Memory (ROM), an Electrically Programmable ROM, an Electrically Erasable Programmable ROM, a register, a hard disk, a removable disk, a CD-ROM, or any other storage media well-known in the art.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method for accessing the Internet, comprising:
receiving, by an indoor access point (AP), service set identifier (SSID) information and encryption information of a mobile AP by using a physical connection channel;
storing the SSID information and the encryption information of the mobile AP into a first SSID name;
sending disable information to the mobile AP, wherein the disable information is used for the mobile AP to disable its wireless fidelity Wi-Fi search function; and
enabling the first SSID name so that a mobile terminal in communication with the mobile AP accesses the Internet by invoking the SSID information and the encryption information in the first SSID name.

2. The method according to claim 1, wherein the receiving SSID information and encryption information of a mobile AP specifically comprises:
establishing a physical connection channel to the mobile AP if detecting that the mobile AP has established a physical connection, and receiving the SSID information and the encryption information of the mobile AP by using the physical connection channel.

3. The method according to claim 1, further comprising:
sending SSID information and encryption information in a second SSID name to the mobile AP so that the mobile AP stores the SSID information and the encryption information in the second SSID name into a configuration file.

4. The method according to claim 3, further comprising:
disabling the first SSID name if detecting physical disconnection of the mobile AP so that the mobile terminal in communication with the mobile AP is connected to the Internet by invoking the SSID information and the encryption information in the second SSID name.

5. A method for accessing the Internet, comprising:
sending, by a mobile AP, its SSID information and encryption information to an indoor AP by using a physical connection channel so that the SSID information and the encryption information are written into a first SSID name of the indoor AP;
receiving disable information sent by the indoor AP; and
disabling its Wireless Fidelity Wi-Fi search function according to the disable information so that a mobile terminal in communication with the mobile AP accesses the Internet by invoking the SSID information and the encryption information in the first SSID name of the indoor AP.

6. The method for accessing the Internet according to claim 5, further comprising:
receiving SSID information and encryption information in a second SSID name of the indoor AP from the indoor AP; and
storing the SSID information and the encryption information in the second SSID name into a configuration file.

7. The method for accessing the Internet according to claim 6, further comprising:
interrupting a physical connection with the indoor AP;
receiving enable information of a user; and
enabling its wireless fidelity Wi-Fi search function according to the enable information, and search for the SSID information and the encryption information in the second SSID name of the indoor AP so that the mobile terminal in communication with the mobile AP is connected to the Internet by invoking the SSID information and the encryption information in the second SSID name.

8. An indoor AP, comprising:

a physical interface, configured to establish a physical connection with a mobile AP;

a receiver, configured to receive SSID information and encryption information of a mobile AP after a physical connection channel is established with the mobile AP, and transmit the SSID information and the encryption information of the mobile AP to a storage device;

the storage device, configured to store the SSID information and the encryption information of the mobile AP, which are received by the receiver, into a first SSID name;

a sender, configured to send disable information to the mobile AP after the storage device stores the SSID information and the encryption information of the mobile AP into the first SSID name, wherein the disable information is used for the mobile AP to disable its Wireless Fidelity Wi-Fi search function; and a processor, configured to enable the first SSID name stored in the storage device after the sender sends the disable information so that a mobile terminal in communication with the mobile AP accesses the Internet by invoking the SSID information and the encryption information in the first SSID name.

9. The indoor AP according to claim 8, wherein:

the sender is further configured to send SSID information and encryption information in a second SSID name to the mobile AP after sending the disable information to the mobile AP so that the mobile AP stores the SSID information and the encryption information in the second SSID name into a configuration file.

10. The indoor AP according to claim 8, wherein:

the physical interface is further configured to interrupt a physical connection with the mobile AP; and the processor is further configured to disable the first SSID name in the storage device if the processor detects physical disconnection of the mobile AP so that the mobile terminal in communication with the mobile AP is connected to the Internet by invoking SSID information and encryption information in a second SSID name.

11. A mobile AP, comprising:

a physical interface, configured to establish a physical connection with an indoor AP;

a sender, configured to send its SSID information and encryption information to the indoor AP after a physical connection channel is established with the indoor AP;

a receiver, configured to receive disable information sent by the indoor AP after the sender sends the SSID information and the encryption information to the indoor AP, and transmit the disable information to a processor; and the processor, configured to trigger disabling of its wireless fidelity Wi-Fi search function according to the disable information received by the receiver so that a mobile terminal in communication with the mobile AP accesses the Internet by invoking the SSID information and the encryption information in a first SSID name of the indoor AP.

12. The mobile AP according to claim 11, wherein:

the receiver is further configured to receive SSID information and encryption information in a second SSID name from the indoor AP after receiving the disable information sent by the indoor AP, and transmit the SSID information and the encryption information in the received second SSID name of the indoor AP to a storage device; and the indoor AP further comprises the storage device, configured to store the SSID information and the encryption information in the second SSID name of the mobile AP, which are received by the receiver, into a configuration file.

13. The mobile AP according to claim 11, wherein:

the physical interface is further configured to interrupt a physical connection with the mobile AP;

the receiver is further configured to receive enable information of a user and transmit the enable information to the processor; and the processor is further configured to enable its wireless fidelity Wi-Fi search function according to the enable information received by the receiver, and search for SSID information and encryption information in a second SSID name of the indoor AP so that the mobile terminal in communication with the mobile AP is connected to the Internet by invoking the SSID information and the encryption information in the second SSID name.

* * * * *